UNITED STATES PATENT OFFICE.

JOHN E. BUCHER, OF COVENTRY, RHODE ISLAND, ASSIGNOR TO NITROGEN PRODUCTS COMPANY, OF PROVIDENCE, RHODE ISLAND, A CORPORATION OF RHODE ISLAND.

PROCESS OF PRODUCING UREA.

1,241,920. Specification of Letters Patent. Patented Oct. 2, 1917.

No Drawing. Original application filed July 3, 1914, Serial No. 848,799. Divided and this application filed October 21, 1915. Serial No. 57,095.

*To all whom it may concern:*

Be it known that I, JOHN E. BUCHER, a citizen of the United States, residing at Coventry, in the county of Kent and State of Rhode Island, have invented certain new and useful Improvements in Processes of Producing Urea, of which the following is a specification.

This invention relates to an improved process for the manufacture of urea and, in its preferred form, the process is based upon the interaction of metallic cyanates and ammonium compounds under conditions which particularly favor the formation and recovery of urea.

Heretofore, urea has generally been made by heating solutions of alkali cyanates with solutions of ammonium salts of oxygen containing mineral acids, such as the sulfate and nitrate. In many cases, the resulting solutions were then evaporated to dryness and the urea extracted with solvents such as alcohol or methylated spirit.

In one form of my process, a strong solution of preferably (but not necessarily) highly soluble cyanate, such as that of potassium, may be treated with the requisite quantity of ammonia, and carbon dioxid is then passed into this alkaline solution; suitable temperature and pressure conditions being of course observed during the several steps of the process.

A considerable part of the potassium precipitates out in the form of potassium bicarbonate with the formation of ammonium cyanate:

(1) 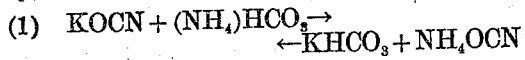

The ammonium cyanate, especially upon heating, changes to urea according to the well known equation:

(2) 

The transformation of ammonium cyanate (equation 2) into urea, which latter is only slightly dissociated, is fairly complete and becomes practically quantitative upon evaporating the water. This change reduces the concentration of ammonium cyanate or the ions resulting from its dissociation and consequently it overcomes, in a large measure, the factor which, by opposing the formation of potassium bicarbonate, makes equation 1 incomplete.

If desired the concentration of urea may be made still higher by the addition of solid alkali cyanate either before or after the removal of the original precipitate of potassium bicarbonate. The strengthening of the solution by the addition of solid alkali cyanates is especially advantageous when sodium cyanate, which is much less soluble than potassium cyanate, is used.

On account of the great difference in solubilities, a strong solution of urea with comparatively small quantities of the alkali compound is obtained. The urea can very easily be separated from the alkali compounds in pure condition by taking advantage of the differing rates of change of solubility with the temperature.

Distillation of water may be carried on under diminished pressure, or, in a current of carbon dioxid so as to prevent the change of alkali bicarbonate to neutral carbonate either by loss of $CO_2$ due to dissociation or by neutralization due to the formation of ammonia by the hydrolysis of cyanate or urea.

When sodium cyanate is used, the change of this sparingly soluble acid sodium carbonate to the more soluble normal carbonate offers another method of separating pure urea and it may even be changed intentionally by the addition of free alkali such as ammonia. For example:

Pure urea can only crystallize from such a solution so long as the latter remains unsaturated with bicarbonate. If now ammonia be added, the acid carbonate will be changed to the much more soluble normal carbonate, and further large quantities of pure urea may be obtained by continuing the crystallization of the urea until the normal carbonate begins to separate out. The solution may then again be saturated with carbon dioxid to remove, by further precipitation, a considerable part of the remaining sodium as bicarbonate, and the just described process may be repeated until the solution becomes too much charged with ammonium carbonates. It is then returned to the initial part of the process for the preparation of another portion of urea according to equation 1.

Many forms of apparatus may be used, but, since those forms at present employed commercially in the ammonia-soda process are peculiarly well adapted for this method of preparing urea, no special apparatus need be exemplified.

The sodium cyanate and the ammonia may be obtained from any source, but both are preferably obtained from atmospheric nitrogen. I prefer to fix the nitrogen according to the equation:

(3)  $2Na_2CO_3 + 5C + 2N_2 = 4NaCN + 3CO_2$ with a heated mixture of sodium carbonate, finely divided iron and carbon as described in my application for United States Letters Patent, Serial Number 799,798, filed Nov. 7, 1913, and entitled—Method of fixing nitrogen, and then to distil out the cyanid under diminished pressure as described in my U. S. Patent No. 1,094,976. The molten cyanid distillate is then treated with air at a low red heat according to the exothermic reaction:

(4)  $NaCN + air = NaOCN + nitrogen$.

This procedure, since it uses the molten cyanid as obtained from the distillation process, has the great advantage of not requiring the heating up and the melting of the cyanid, of giving out heat which can be utilized, and of giving a practically unlimited supply of substantially pure atmospheric nitrogen for the cyanid forming operation (equation 3).

One-half of the product may then be used directly as sodium cyanate while the rest is very readily converted into ammonia and sodium carbonate by the action of hot water, or steam, thus furnishing both the cyanate and ammonia, as well as a part of the carbon dioxid, which are required in equation 1:

(5)  $2NaOCN + 4H_2O =$
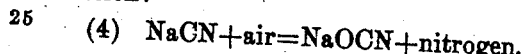
$Na_2CO_3 + H_2O + CO_2 + 2NH_3$

The alkali compounds as well as the carbon dioxid thus act cyclically, and air, water and carbon comprise all the elements entering into urea. This procedure because of using organic acids has the further advantage of avoiding the use of mineral acids, such as sulfuric, for neutralizing the ammonia when such salts as ammonium sulfate are used for the preparation of urea.

The above mentioned decomposition of cyanate of urea into ammonia during the process causes no loss of urea as it may be compensated by using somewhat more than 50% of the nitrogen required in equation 1 in the form of cyanate so that this excess of cyanate may produce some of the requisite ammonia directly in the liquid in which the urea is to be prepared.

I am aware that various changes may be made in my process and that the steps of the method, as I have described them by way of exemplification, may be varied or alternated widely, without departing from the spirit of my invention, and I, hence, desire to be limited only by the scope of the appended claims.

For example, instead of using ammonia and carbon dioxid; acid ammonium carbonate may be employed, and since both potassium cyanate and urea are highly soluble, the former may be practically treated with acid ammonium carbonate to form potassium bicarbonate. In the case of alkaline earth cyanates such as those of barium or calcium, where the relative solubility of normal acid carbonates is just the reverse of what it is in case of sodium, it is highly desirable to effect the formation of the practically insoluble normal carbonates as per the equation:

(6)  $Ba(OCN)_2 + (NH_4)_2CO_3 \rightarrow$
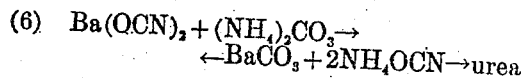
$\leftarrow BaCO_3 + 2NH_4OCN \rightarrow$ urea so as to precipitate the metal substantially quantitatively, in order that even the necessity for separation by crystallization may be avoided. Here it is only necessary to filter out the precipitated carbonate and then evaporate directly to dryness in order to get the urea.

It should be here observed, therefore, that in the claims the term "alkali metal" is to be regarded as of sufficient breadth to include all of those metals of the alkali and alkaline earth metal groups which are available for use in the process.

In general, I believe that the use of a suitable salt of an organic acid, in contradistinction to a mineral acid salt, is broadly new; and obviously, of course, the ammonium salt of, for example, carbonic acid, may be supplied as such or it may be formed more or less evanescently during the course of the process, as by introducing carbon dioxid into the urea yielding mass.

Finally, while it is preferred to use carbonic acid, I do not desire to be limited to this latter since the process broadly contemplates the re-action upon a metallic cyanate, in the presence of water with an ammonium salt of any suitable acid which will form such a sparingly soluble acid salt with the metal of the cyanate as to give a precipitate of said acid salt when the latter is formed together with ammonium cyanate.

The present case comprises claims which have been divided out of the parent application hereof, Serial No. 848,799, filed July 3, 1914, and entitled Process of producing urea.

Having thus described my invention what I claim is:

1. The process of forming urea which comprises reacting upon a metallic cyanate, in the presence of water, with an ammonium salt of an acid which forms such a sparingly soluble acid salt with the metal of the cyanate as to give a precipitate of said acid salt when the latter is formed together with ammonium cyanate, generating said ammonium salt in the solution while effecting the reaction thereof upon said metallic cyanate, by treatment of the solution with ammonia and a gaseous reagent which combines with water to form the acid from which said ammonium salt is derived, converting said ammonium cyanate into urea, and separating said precipitate from the urea.

2. The process of forming urea which comprises reacting upon a metallic cyanate, in the presence of water, with an ammonium salt of an acid which forms such a sparingly soluble acid salt with the metal of the cyanate as to give a precipitate of said acid salt when the latter is formed together with ammonium cyanate, generating said ammonium salt in the solution while effecting the reaction thereof upon said metallic cyanate, converting said ammonium cyanate into urea, and separating said precipitate from the urea.

3. The process of forming urea which comprises reacting upon a metallic cyanate, in the presence of water with an ammonium salt of an acid which forms such a sparingly soluble acid salt with the metal of the cyanate as to give a precipitate of said acid salt when the latter is formed together with ammonium cyanate, generating said ammonium salt in the solution while effecting the reaction thereof upon said metallic cyanate, by treatment of the solution with ammonia and an anhydrous reagent which combines with water to form the acid from which the ammonium salt is derived, converting said ammonium cyanate into urea, and separating said precipitate from the urea.

4. The process of forming urea which comprises reacting upon a metallic cyanate, in the presence of water with an ammonium salt of an acid which forms such a sparingly soluble acid salt with the metal of the cyanate as to give a precipitate of said acid salt when the latter is formed together with ammonium cyanate, generating said ammonium salt in the solution while effecting the reaction thereof upon said metallic cyanate, by treatment of the solution with ammonia and an anhydrous reagent which combines with water to form the acid from which the ammonium salt is derived, converting said ammonium cyanate into urea, and separating said precipitate from the urea, a portion at least of the required ammonia for said solution being generated by the decomposition of the said cyanogen compound in said water.

5. The process of forming urea which comprises reacting upon an alkali cyanate with an ammonium salt of carbonic acid in the presence of water, to form ammonium cyanate and an acid alkali salt of carbonic acid, converting said ammonium cyanate acid into urea, and separating the latter from the residues of the reaction by distilling off the water while passing carbon dioxid through the liquid to prevent the change of alkali bicarbonate to neutral carbonate.

In testimony whereof I have affixed my signature, in the presence of two witnesses.

JOHN E. BUCHER.

Witnesses:
    HOWARD F. HYLAND,
    HELEN M. BARNBROOK.

Copies of this patent may be obtained for five cents each, by addressing the "Commissioner of Patents, Washington, D. C."